Aug. 18, 1964 P. H. GIROUARD ETAL 3,144,809

BREECH BLOCK OPERATING MECHANISM

Original Filed Aug. 27, 1952 7 Sheets-Sheet 1

INVENTORS
PHILIAS H. GIROUARD
CARL V. HICKMAN-DECEASED
GAROLD A. KANE
JOHN I. NELSON
MILTON C. NEUMAN
HARRISON RANDOLPH
THOMAS C. COLLIER.

By

ATTYS

INVENTORS
PHILIAS H. GIROUARD
CARL V. HICKMAN-DECEASED
GAROLD A. KANE
JOHN I. NELSON
MILTON C. NEUMAN
HARRISON RANDOLPH
THOMAS C. COLLIER
By ATTYS

Aug. 18, 1964 P. H. GIROUARD ETAL 3,144,809

BREECH BLOCK OPERATING MECHANISM

Original Filed Aug. 27, 1952 7 Sheets-Sheet 3

INVENTORS
PHILIAS H. GIROUARD
CARL V. HICKMAN DECEASED
GAROLD A. KANE
JOHN I. NELSON
MILTON C. NEUMAN
HARRISON RANDOLPH
THOMAS C. COLLIER

By ATTORNEYS

INVENTORS
PHILIAS H. GIROUARD
CARL V. HICKMAN-DECEASED
GAROLD A. KANE
JOHN I. NELSON
MILTON C. NEUMAN
HARRISON RANDOLPH
By THOMAS C. COLLIER
ATTORNEYS

INVENTORS
PHILIAS A. GIROUARD
CARL V. HICKMAN-DECEASED
GAROLD A. KANE
JOHN I NELSON
MILTON C. NEUMAN
HARRISON RANDOLPH
THOMAS C. COLLIER
By
ATTORNEYS

BREECH BLOCK OPERATING MECHANISM

Original Filed Aug. 27, 1952 7 Sheets-Sheet 6

INVENTORS
PHILIAS H. GIROUARD
CARL V. HICKMAN, DECEASED
GAROLD A. KANE
JOHN I. NELSON
MILTON C. NEUMAN
HARRISON RANDOLPH
THOMAS C. COLLIER

By ATTORNEYS

Aug. 18, 1964 P. H. GIROUARD ETAL 3,144,809

BREECH BLOCK OPERATING MECHANISM

Original Filed Aug. 27, 1952 7 Sheets-Sheet 7

INVENTORS
PHILIAS H. GIROUARD
CARL V. HICKMAN, DECEASED
GAROLD A. KANE
JOHN I. NELSON
MILTON C. NEUMAN
HARRISON RANDOLPH
THOMAS C. COLLIER

By ATTORNEYS

United States Patent Office 3,144,809
Patented Aug. 18, 1964

3,144,809

BREECH BLOCK OPERATING MECHANISM

Philias H. Girouard, Washington, D.C., Carl V. Hickman, deceased, late of Kensington, Md., by Jean W. Hickman, administratrix, Washington, D.C., Garold A. Kane, John I. Nelson, Milton C. Neuman, and Harrison Randolph, Minneapolis, Minn., and Thomas C. Collier, Portsmouth, N.H., assignors, by direct and mesne assignments, to the United States of America as represented by the Secretary of the Navy Original application Aug. 27, 1952, Ser. No. 306,612. Divided and this application July 9, 1958, Ser. No. 750,844

2 Claims. (Cl. 89—4)

The present invention relates to major caliber guns with calibers of the order of magnitude of five inches or greater preferably employing separate or semi-fixed ammunition and intended to be effective for both anti-aircraft and surface fire and particularly to the mount structure for such guns and the ammunition handling features thereof.

This application is a division of copending application Serial No. 306,612, filed August 27, 1952 by the present applicants.

In guns of this caliber it is highly desirable that a substantially normal or conventional position of the gun trunnions be maintained in order to keep the weight of the gun at a minimum in effecting a proper gun balance. In the present invention the gun can be loaded in any position of elevation and of course in any position of turning or training. This makes the invention of high utility in anti-aircraft use.

The instrumentalities for so loading the gun are practically all automatic in their operation and when so operated, are for the most part hydraulically actuated, suitable interlocks being provided to insure the proper sequence of operation and to prevent improper firing of the gun. While the gun of the present invention is to be understood as having a conventional turret mounting, in that it is intended primarily for naval use, this is not necessarily essential. Other well known types of gun mountings may be employed within the purview of the present invention to make the gun available for general military use, whether naval or otherwise. While in the embodiment of the invention illustrated only one gun is shown, it is obvious that the inventive concepts and much of the structure described would be equally applicable to a mount carrying more than one gun.

The mount in general has means for supplying ammunition to the gun including a lower hoist installed on the fixed structure of the ship or other foundation. Said hoist comprises one or more hoist tubes. In the embodiment of the invention illustrated, said hoist comprises a pair of spaced tubes. The units or rounds of ammunition are automatically fed to said tubes respectively by loaders. There is a loader for each tube and the units or rounds of ammunition are manually fed to said loaders. (It may be noted that this is the only manual operation involved in the operation of the mount while in automatic operation, and further that the manual feed can be continued in order to replenish the ammunition in the various mount parts receiving the same at all times during automatic operation.)

The said loaders are identical and while their structure may be varied to suit the particular ammunition used, in the embodiment of the invention illustrated each loader comprises a casing in which are disposed two superposed rotatable drums arranged in axial alignment. Each drum has a series of circumferentially spaced chambers. These chambers in the upper drum receive the projectiles and said chambers in the lower drum receive the powder cases. The casing has an opening for each drum provided with one or more swinging doors and the powder cases and projectiles are pushed against and past said doors through said openings into said chambers in the respective drums. Said drums are automatically rotated or indexed and means are provided for preventing indexing while ammunition is being fed into said drums and for locking said doors to prevent feeding of ammunition while said drums are being indexed. This protects the operators. The drums move the projectiles and powder cases into alignment with and into said hoist tubes or passages. The lower hoist has chains moving through said tubes to elevate the ammunition in said tubes to a rotatable carrier. A support is provided for the projectile when moved into said tube and this support is moved from beneath the projectile allowing the latter to rest on top of the powder case and the round is thus moved up in tandem with the projectile riding directly on the powder case plug. The chains in the lower hoist tubes are equipped with retaining members which prevent shucking of the ammunition units during deceleration of the hoist.

The carrier to which the round of ammunition is delivered by said lower hoist is rotatably mounted on a central column which depends from the gun supporting portion or mount proper. The said carrier has circumferentially spaced chambers which receive the ammunition from the tubes of said lower hoist. In the embodiment of the invention illustrated, said chambers in the carrier are spaced 180 degrees apart. The carrier is automatically rotated to bring the chambers thereof into alignment with one or more tubes or passages of an upper hoist, which upper hoist is carried by and rotates with the gun or the mount proper. In the embodiment of the invention illustrated, the upper hoist has two tubes spaced 180 degrees apart. The carrier has a control mechanism which receives information as to the position of the mount proper, and the velocity and direction of rotation of the mount proper. This information is added mechanically and the carrier drive and control mechanism therefor is triggered to cause rotation of the carrier in a direction which will bring its said chambers into alignment with the said tubes of the upper or lower hoists in the shortest period of time. The carrier is provided with latches which are operated to latch it to the upper and lower hoists respectively. Either chamber of said carrier can deliver to either tube of the upper hoist.

The ammunition is automatically transferred laterally from the chambers in the carrier to the tubes of the upper hoists while the carrier is latched to the upper hoist. Upon completion of the transfer the carrier automatically returns to the lower hoist and is latched thereto in position to receive further ammunition from the lower hoist.

The upper hoist, which is illustrated as a shuttle hoist, elevates the units or rounds of ammunition to a cradle. In the embodiment of the invention illustrated, two cradles are provided, one at each side of the gun. Said cradles are respectively carried on arms which respectively swing about the axis of the gun trunnions. The cradle comprises a casing having a chamber therein which receives the unit or round of ammunition from the upper hoist while said chamber is in a substantially vertical position, vertically aligned with an upper hoist tube and latched to the upper hoist. The cradle is then automatically swung upward to bring the casing and chamber thereof into position at the rear of the gun and substantially parallel to the gun axis and alongside a transfer tray. The round of ammunition is then automatically transferred laterally or sidewise from the cradle to said transfer tray.

In the embodiment of the invention illustrated two transfer trays are provided, one at each side of the gun adjacent the rear thereof. The round is clamped in position in the transfer tray and while the transfer tray is in its receiving position, the mechanical time fuse is set. The fuse pot of the fuse setter mechanism is automatically moved to engage and set the said time fuse and the fuse pot is then retracted.

Each tray is moved from a receiving position in which it is substantially parallel to the gun axis and at one side and adjacent the rear of the gun, in which position it receives the round from the cradle, to a discharging or ramming position in axial alignment with the gun bore. The round is then rammed from the tray into the breech by the rammer. The transfer trays are alternately moved to a ramming position so that one tray is being loaded while the other is having the round rammed therefrom. As soon as the rammer cross-head has cleared the forward end of the transfer tray the transfer tray starts back to receiving position.

The breech block is raised to closing position immediately after the rammer is retracted.

As soon as the charge is fired the breech block is lowered. The operation of the breech block both in closing and opening is automatically and hydraulically powered. Triggering of the opening cycle of the block is accomplished by valving which is actuated during recoil.

An empty case tray is provided which moves from a receiving position in which it is in substantial alignment with the gun bore to a discharge position below the gun bore. The empty case tray moves to its receiving position between each movement of a transfer tray to ramming position. Suitable interlocks are provided to prevent any interference of the transfer trays and the empty case tray.

A discharge chute for the empty cases is provided into which the empty cases are discharged by the empty case tray. The empty cases are then moved through said chute and are discharged at the end thereof.

In the light of the foregoing, it is an object of this invention to provide a mount for a gun comprising means for supplying ammunition to said gun including a series of cooperating mechanisms which move the round from the loading deck to the gun.

It is another object of this invention to provide a mount for a gun having parts powered from an accumulator system, a recoil mechanism for said gun together with means actuated by the recoil of said gun for charging fluid into the accumulator system.

It is also an object of this invention to provide a mount for a gun, including a breech block movable to operative or closed position and to inoperative or open position, together with a novel and efficient power operated mechanism for moving said block to said positions.

It is still another object of this invention to provide a mount for a gun, including a breech block movable to operative or closed position and to inoperative or open position, together with novel and efficient manually operated mechanism for moving said block to said positions.

These and other objects and advantages of the invention will be fully set forth in the following description made in connection with the accompanying drawings in which like reference characters refer to similar parts throughout the several views and in which:

FIG. 1 is a somewhat schematic perspective view of the mount, some parts being broken away;

FIG. 1*a* is a schematic perspective view of the upper portion of the mount, some parts being broken away;

FIG. 1*b* is a vertical section taken substantially on line 1*b*—1*b* of FIG. 1*a* looking forwardly as indicated by the arrows;

Figure 1:
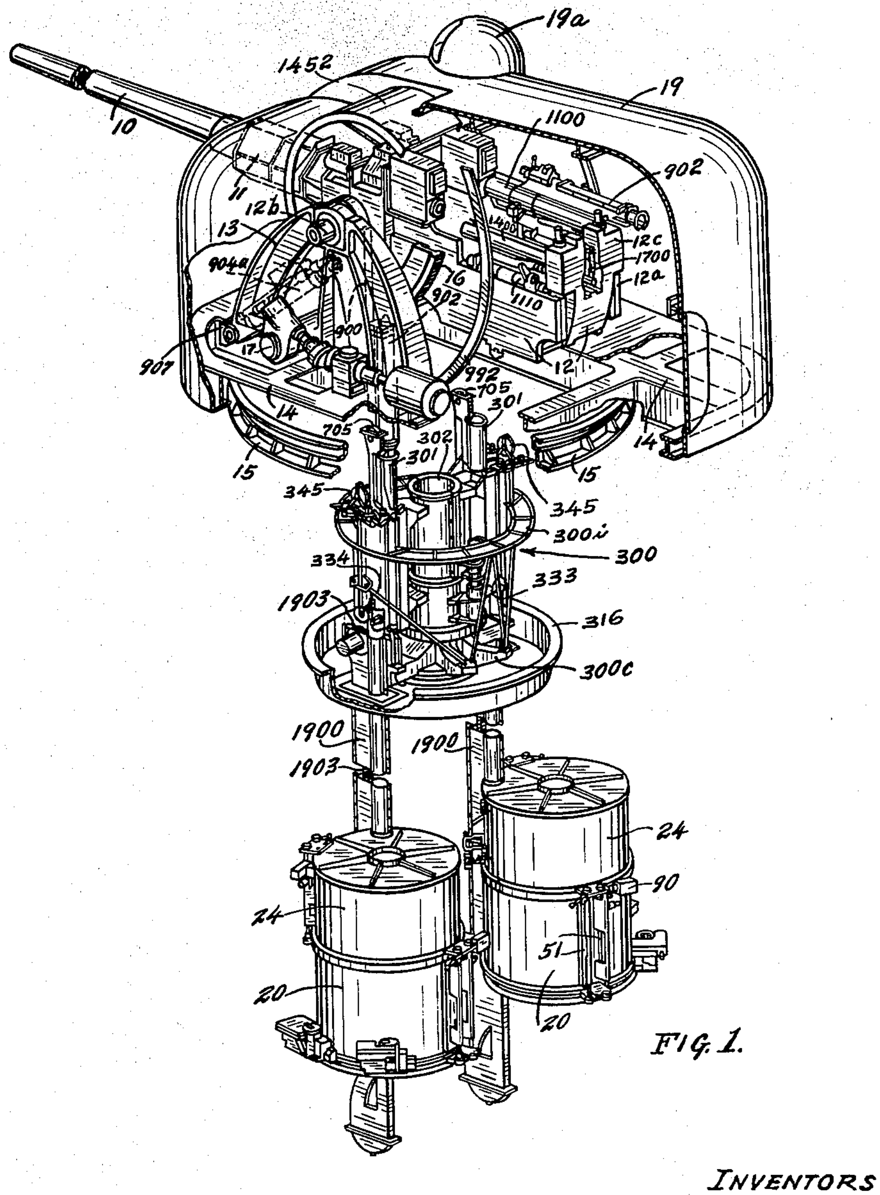
Figure 1A:
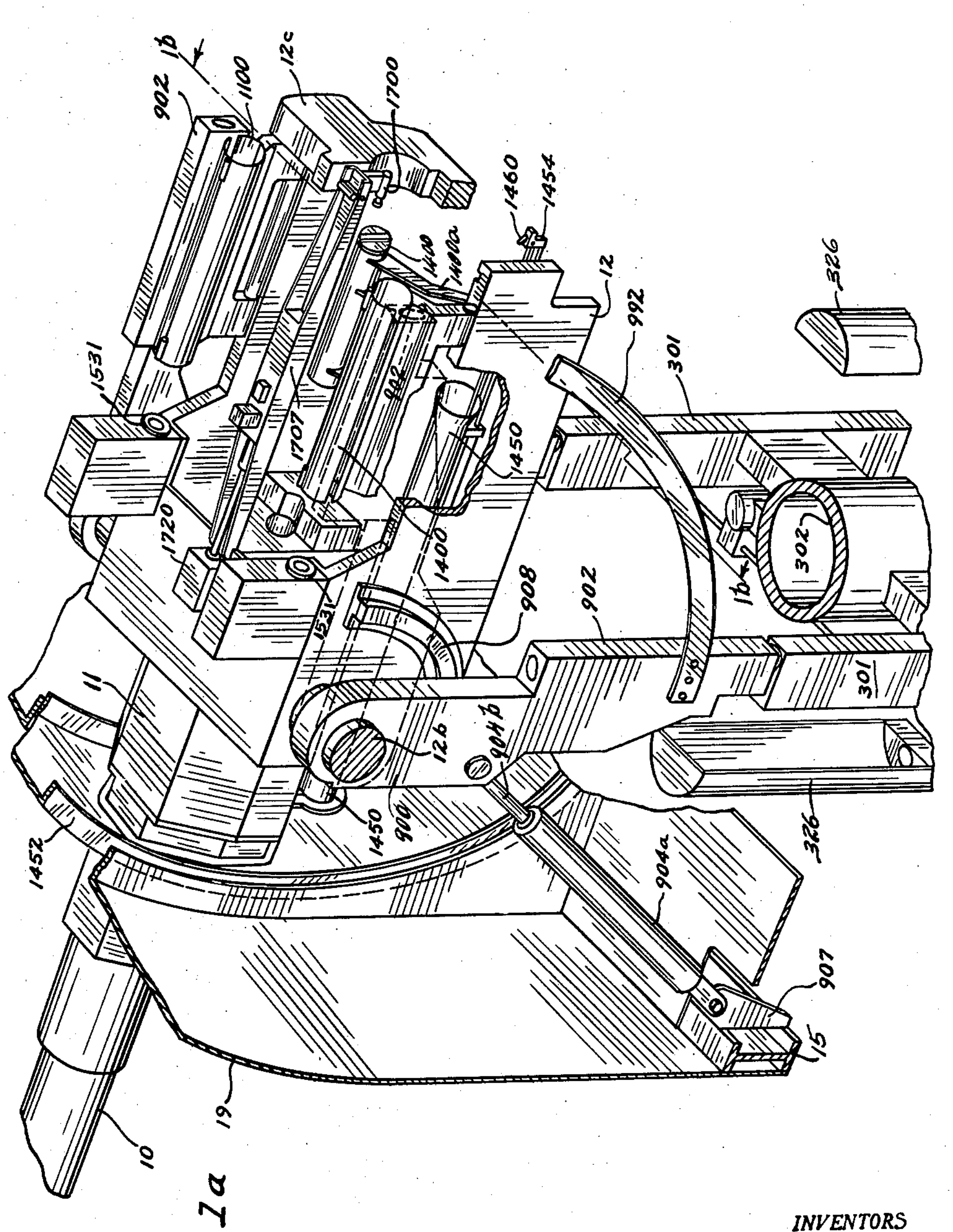
Figure 1B:
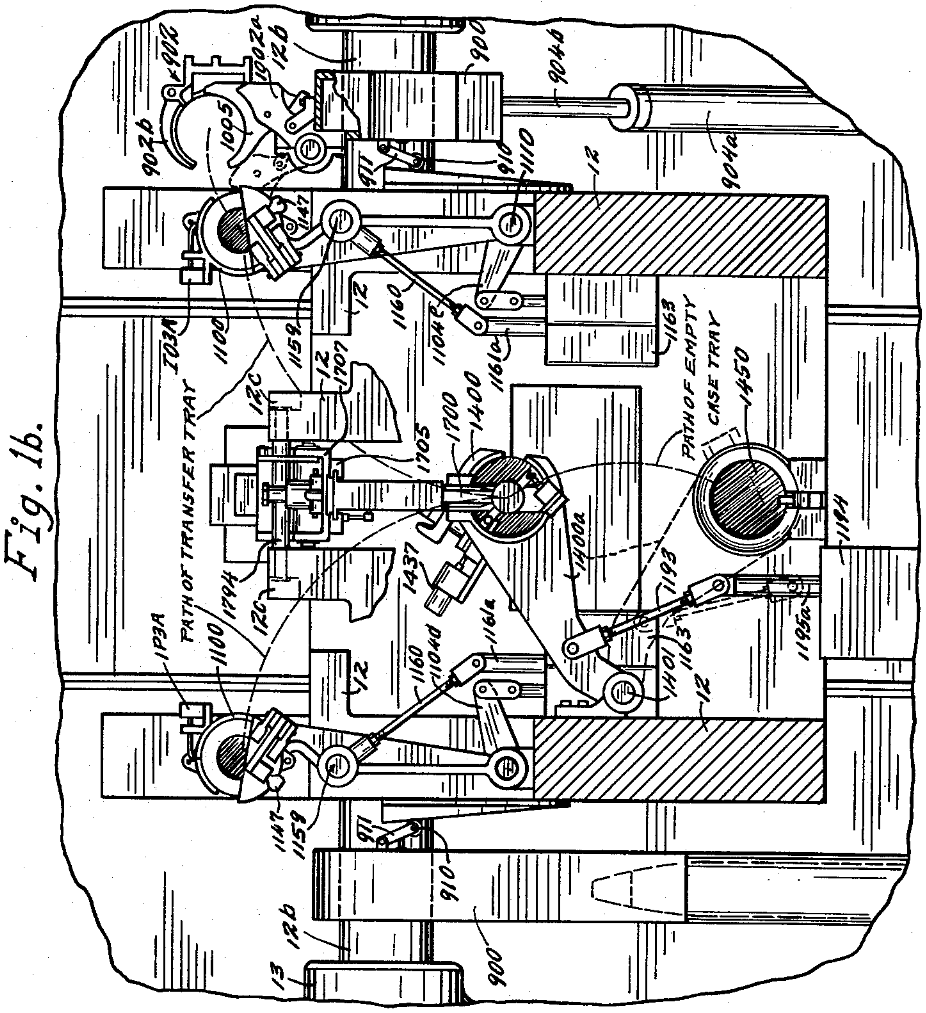
Figure 2:
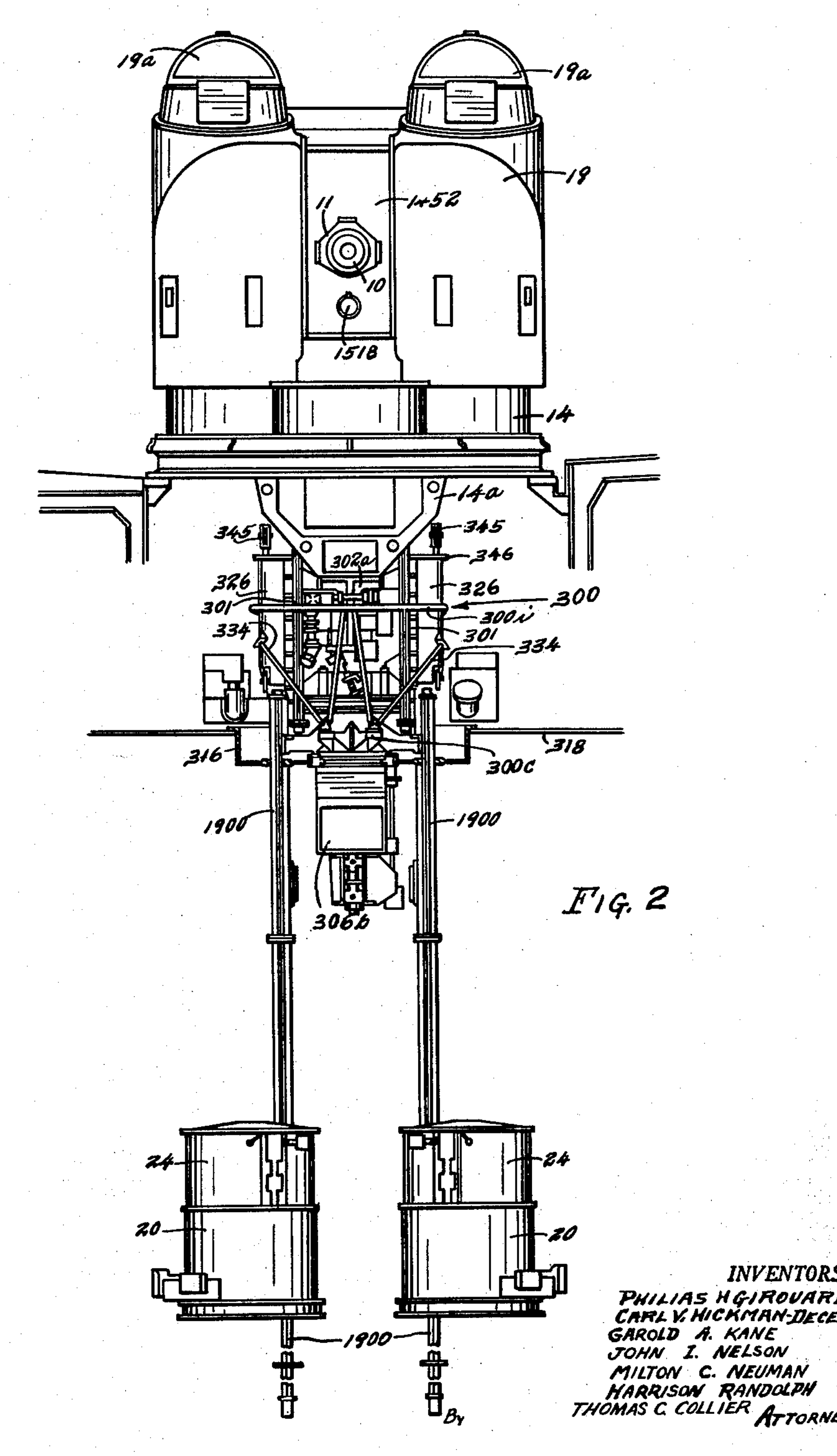
FIG. 2 is a view in front elevation of the principal portions of the mount.

Before proceeding with the detailed description of the various parts of the breech block mechanism, a general description of the mount in connection with the showing in FIGS. 1, 1*a*, 1*b* and 2 will be given.

As above stated, the mount comprises the loader which includes two identical loading devices. Each of these devices comprises the lower casing 20 and an upper casing 24. A powder case drum 28 is rotatable in each casing 20 and a projectile drum 40 is rotatable in each casing 24. The powder cases are pushed into the casing 20 and into the powder case drum by the operator. The case is pushed against and past a pair of resiliently mounted doors 51 and the projectiles are similarly pushed into the casings 24 and into the projectile drum through a similar pair of doors 27. The powder case drums and the projectile drums are rotated or indexed step by step and the round of ammunition comprising the powder case and projectile is brought into alignment with the hoist tubes **1900*a* in the casings 1900 of the lower hoist. Chains 1903 move in the casings 1900 and have pawls 1908** thereon which engage the bottom of the powder case and move the same upwardly in said tubes. The projectile rests on top of the powder case and is moved up by the same.

The lower hoist moves the round comprising the powder case and a projectile into a round-receiving chamber in a carrier 300. The carrier 300 at its lower end moves within a ring 316 having a circumferential flange supported upon the main deck. The casings 1900 of the lower hoist at their upper ends are also within ring 316. The carrier rotates on ball bearings 307 about a central column 302 which is secured to a frame **15*a* which depends from and is secured to frame 15 and thus depends from the gun support or mount proper. Carrier 300 has a spider 300*b* adjacent its lower end. Said carrier has round-receiving chambers in casings 326** at each side thereof.

An upper hoist is provided and this comprises the hoist tube casings 301 which are carried by brackets 303 secured to a portion **302*a* of the central column which is in turn secured to frame 15*a*. The casings 301 are 180 degrees apart. The upper hoist thus rotates with the central column and thus with the mount proper on which the gun 10 is mounted. The round of ammunition is transferred laterally by suitable mechanism from the chambers in the carrier 300 to the tubes of the upper hoist in casings 301. The carrier 300** is rotated so as to bring the round-receiving chambers therein into axial alignment with the tubes of the lower hoist and is latched in such position. After receiving the round the carrier is rotated to bring the chambers therein into lateral or radial alignment with the tubes in the upper hoist and is latched to the upper hoist in this position.

The upper hoist moves the round to and into a cradle

902. Cradle 902 comprises a generally cylindrical casing open at its receiving end. The cradle when in receiving position is in axial vertical alignment with a tube of the upper hoist and is latched in this position. Said cradle 902 is carried on an arm 900 which is in turn oscillatably mounted upon a journal projecting from and coaxial with the gun trunnion 12*b* so that said arm 900 swings about the axis of the gun trunnion. Arm 900 has pivotally connected thereto an arm 904 which comprises a hydraulic cylinder 904*a* and piston 904*a* so that it is extensible. Arm 904 is pivoted at its other end to the base ring 14. When the round of ammunition has been transferred to the cradle by the upper hoist, arm 904 is extended and the cradle is swung upwardly to a position adjacent the rear of the gun and with its axis substantially parallel to the axis of the gun. The cradle is guided in this movement by an arcuate guide bar 992.

The upper position of the cradle 902 is its discharge position and it is then alongside and parallel to the transfer tray 1100 and is latched to the slide 12. Mechanism is provided to transfer the round sidewise from the cradle 902 into the transfer tray 1100. The fuse of the projectile is set by the fuse pot 1531 while the round is in the transfer tray. The transfer tray 1100 is then swung down to be coaxial with the bore of gun 10 and the round is then rammed by the rammer spade 1700 from the tray 1100 into the breech of the gun.

The gun 10 and housing 11 have the usual recoil construction and move relatively to the slide 12. Slide 12 includes large side plates 12*a* and a tailpiece 12*c*. The slide is carried on the trunnions 12*b*. The trunnions are journaled in large side frames 13 which are secured to the base ring 14. Base ring 14 is a large weldment of general rectangular form with rounded corners. The slide and gun are elevated by a power driven pinion engaging the gear segment 16 secured to the slide.

*Breech Block Mechanism*

Figure 3:
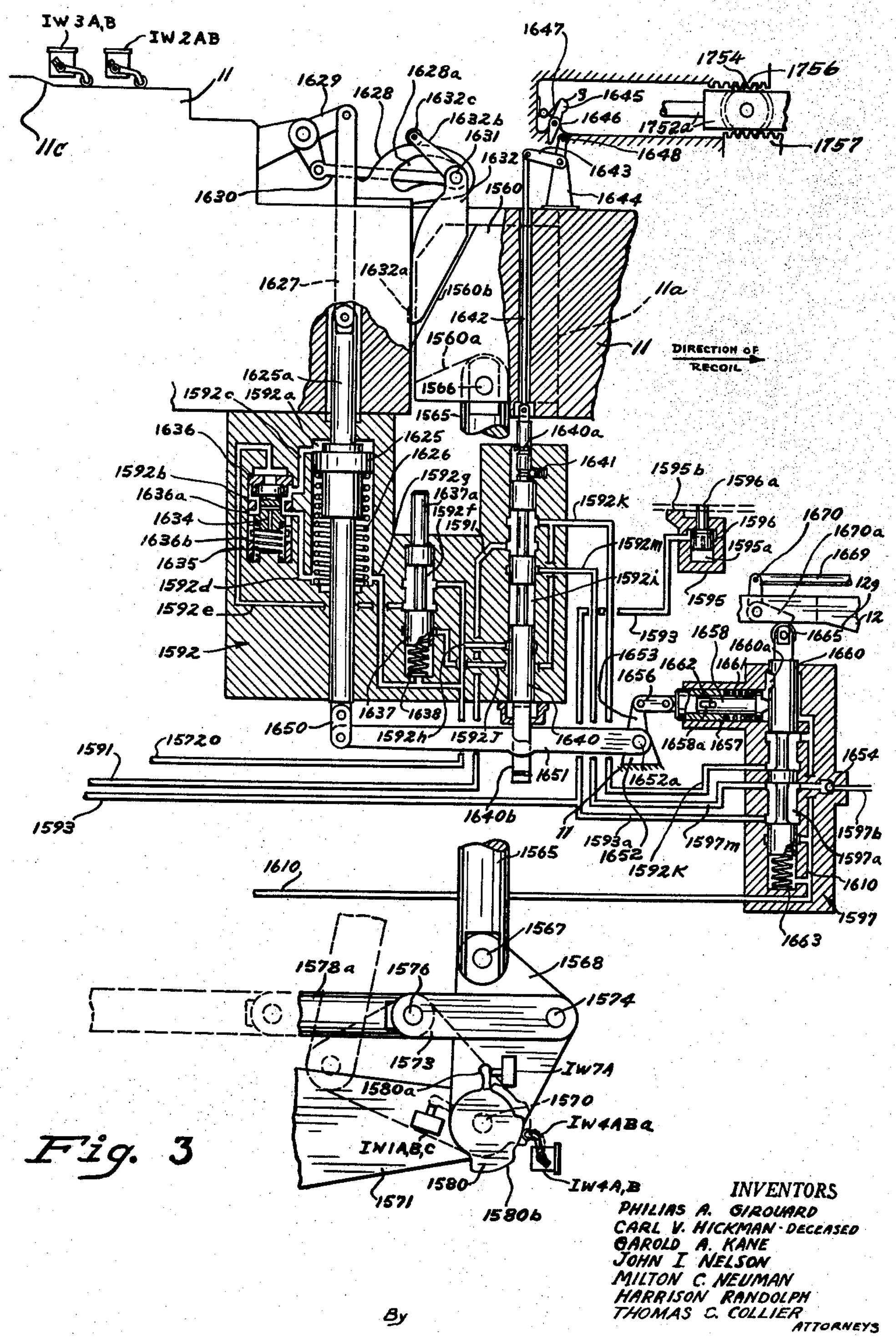
FIG. 3 is a schematic view partly in side elevation and partly in vertical section of the breech block and a portion of the operating mechanism therefor.
Figure 4:
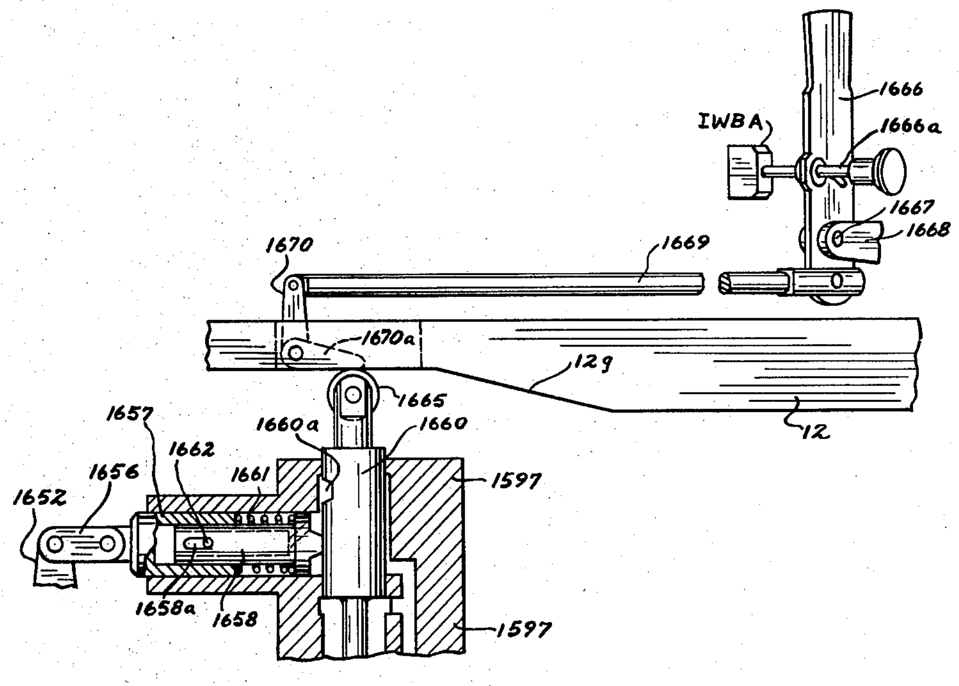
FIG. 4 is a schematic view partly in side elevation and partly in vertical section of another portion of the breech block operating mechanism.
Figure 5:
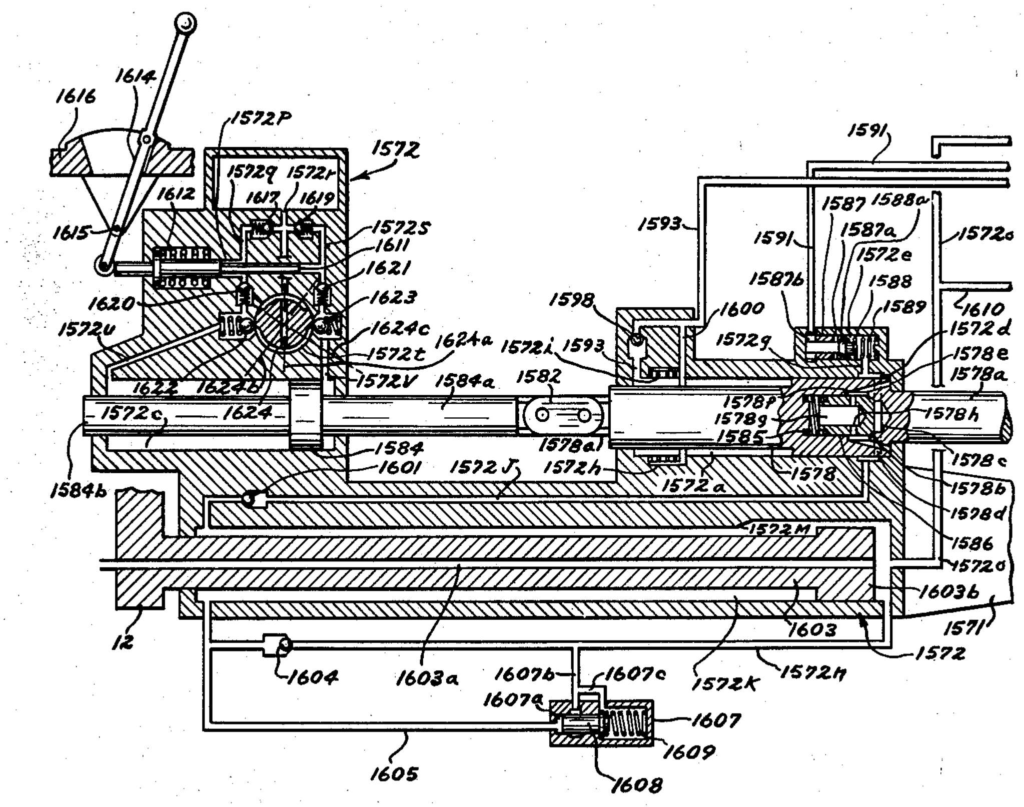
FIG. 5 is a schematic view in vertical section of another portion of the operating mechanism for the breech block.

Referring to FIGS. 3–5, a breech block for the gun is shown as 1560. Said breech block is moved vertically into a firing or breech-closing position and to a ram or inoperative position. Block 1560 has a slight upward taper and when in firing position is wedged between a surface 11*a* of the gun housing 11 and the rear surface of the powder case. The rim of the powder case is between the block and the rear surface of the gun. A link 1565 is pivotally connected to the lower portion of block 1560 by the pivot pin 1566, the upper portion of said link moving in a recess 1560*a* in the bottom of the breech block. Link 1565 is pivotally connected by a pin 1567 to a lever 1568 which is swingable about a shaft 1570 carried in the outer end portion of bracket 1571 projecting from a valve block 1572 movable with the gun in its recoil and counter-recoil movement. Lever 1568 is generally of triangular shape and has pivoted adjacent one side thereof by a pin 1574, a link 1573. Link 1573 is pivotally connected at its other end by a pin 1576 to a valve rod 1578*a* of a valve 1578 movable in a valve chamber 1572*a* of valve block 1572. Shaft 1570 has secured thereto a cam 1580 having at one side an arm 1580*a* adapted in one position of said cam to actuate a switch IW7A and in another position of said cam to actuate a switch IW1A,B,C. Said cam 1580 also has a cam surface 1580*b* adapted in the movement of said cam to actuate a switch IW4A,B, which switch has an actuating arm IW4A,B*a* carrying a roller adapted to engage the cam surface 1580*b*.

A piston valve 1578 reciprocates in valve block 1572 and this moves valve rod 1578*a* and swings lever 1568 from the position shown in full lines in FIG. 3 to the dotted line position shown in said figure and this pulls down upon link 1565 and lowers the breech block. Valve 1578 has a reduced portion 1578*a1* which projects through the front end of block 1572 and is connected by a link 1582 to a valve rod 1584*a* of a piston 1584 movable in a chamber 1572*c* of block 1572. Piston 1584 has a rod 1584*b* which projects through the front end of block 1572.

Valve 1578 has an axial recess therein adjacent rod 1578*a1* in which is disposed a valve 1586. Valve 1586 has a beveled front surface which engages a surface on an annular portion 1578*b* of valve 1578, which portion 1578*b* surrounds an opening 1578*c* in valve 1578. Valve 1586 is held against said surface by a compression coiled spring 1585. A plurality of radial passages 1578*d* extend from the opening or chamber 1578*c* to the outer cylindrical surface of valve 1578. A plurality of passages 1578*e* extend from the rear end of valve 1578 to an annular chamber 1578*f* surrounding valve 1586 at its rear end. Valve 1586 has an axial bore or chamber 1578*g* therein from which extend a plurality of radial passages 1578*h*, said last mentioned passages extending to chamber 1578*f* and thus communicating with passages 1578*e*. Valve block 1572 has an annular chamber 1572*d* extending about the rear end of valve chamber 1572*a*. Said block also has therein a valve chamber 1572*e* in one part of which is disposed a valve 1587 having a flaring open rear end with which engages a beveled valve 1588 moved into such engagement by a compression coiled spring 1589, the other end of which engages one end of valve chamber 1572*e*. A number of small passages 1588*a* extend along the beveled surface of valve 1588. Valve 1587 has an axial chamber therein and a plurality of passages 1587*a* extend from said chamber to the exterior of said valve. Valve 1587 also has a plurality of passages 1587*b* extending through the wall thereof at its front end. A passage 1572*g* connects valve chamber 1572*e* to the annular chamber 1572*d* and thus to valve chamber 1572*a*. A conduit and passage 1591 extends from the front end of valve chamber 1572*e* to a valve block 1592 which is movable with the gun in its recoil and counter-recoil. A conduit and passage 1593 extends from one end of valve chamber 1572*a* to a valve block 1595. There are a number of the valve blocks 1595 and in practice three of these have been used. Each valve block 1595 has therein a valve 1596 movable in a chamber 1595*a* of the block 1595 and said valve has a plunger 1596*a* projecting above the top of block 1595. Block 1595 has a portion with a top surface 1595*b* which is a short distance below the upper end of plungers 1596 when the latter are in their upper positions. In practice this distance has been approximately one-quarter of an inch. When the bottom of the breech block is in the plane of the upper ends of plungers 1596 in their upper positions, it is in ram position. Each valve 1595 has a small passage extending from the bottom thereof to adjacent its top from which small radial passages extend to an upper enlarged end of valve chamber 1595*a*. Blocks 1595 are so located that the plungers 1596 are engaged by the bottom of said block when the block is lowered. Passage and conduit 1593 also communicates with another passage and conduit 1593*a* which extends to a valve chamber 1597*a* in a valve block 1597 which also moves with the gun in its recoil and counter-recoil movement. Passage 1593 adjacent chamber 1572*a* has therein a chamber in which is disposed a check valve 1598. Another passage 1600 extends from passage 1593 in block 1572 to and around chamber 1572*a* and to an annular chamber 1572*h* in block 1572. A multiplicity of small passages 1572*i* extend from chamber 1572*h* to chamber 1572*a*.

Another passage and conduit 1572*j* extends from chamber 1572*d* to a valve chamber 1572*k* extending longitudinally and some distance in block 1572. Passage 1572*j* has a chamber therein in which is disposed a check valve 1601. A plunger 1603 is disposed in chamber 1572*k* and is connected at a point beyond block 1572 to the slide 12. Chamber 1572*k* has an enlarged portion at its rear end connecting to the main portion by a beveled surface 1572*m*. Plunger 1603 has an enlarged portion 1603*b* at its rear end which fits in passage 1572*k* in the smaller part of said passage to the left of beveled portion 1572_m_, as seen in FIG. 5. Plunger 1603 has an axial passage 1603_a_ extending therethrough and in practice this normally contains supercharge pressure which is in the operation of the block equivalent to being connected to tank. A passage and conduit 1572_n_ extends between the ends of chamber 1572_k_, the same having therein a chamber in which is disposed a check valve 1604. A passage 1605 connects to one end of passage 1572_n_ and also connects with a valve chamber 1607_a_ formed in a valve block 1607, said chamber having an enlarged rear end. A valve 1608 is movable in the smaller end of chamber 1607_a_ and is moved toward said end by a coiled compression spring 1609. A passage 1607_b_ extends from an annular chamber about valve 1608 to passage 1572_n_. A passage 1607_c_ extends from passage 1607_b_ to the enlarged end of valve chamber 1607_a_. Block 1607 and associated parts form a relief valve. A conduit and passage 1572_o_ extends from the rear end of chamber 1572_k_ to a valve chamber 1592_f_ in valve block 1592. A conduit and passage 1610 extends from passage 1572_o_ to and alongside the upper portion of valve chamber 1597_a_, the same having several branches opening into said chamber.

Valve block 1572 carries a portion having a chamber 1572_p_ having a reduced portion in which fits and moves a pump plunger 1611 having an enlarged portion with a collar thereon engaged by a coiled compression spring 1612 disposed in an enlarged portion of chamber 1572_p_ and acting to move plunger 1611 to the left, as shown in FIG. 5. Plunger 1611 projects from block 1572 and at its end is engaged by a roller carried on the lower end of a hand lever 1614 pivoted at 1615 in a bracket 1616 mounted on the gun slide 12. A passage 1572_q_ extends from chamber 1572_p_ to a tank passage 1572_r_. A chamber is disposed in passage 1572_q_ and contains a spring-pressed check valve 1617. A passage 1572_s_ extends from one end of chamber 1572_p_ to the tank passage 1572_r_ and contains a chamber in which is disposed a spring-pressed check valve 1619. The passages 1572_q_, 1572_s_ and 1572_r_ extend below the chamber 1572_p_, as shown in FIG. 5, to a valve chamber 1572_t_. Said passages each have a chamber below chamber 1572_p_ in which are respectively disposed spring-pressed check valves 1620 and 1621. Said latter check valves prevent the flow of liquid toward chamber 1572_p_. Valve chamber 1572_t_ has passages leading from either side thereof which are adapted to be closed by spring-pressed check valves 1622 and 1623. Passages 1572_u_ and 1572_v_ lead respectively from the chambers of valves 1622 and 1623 to the ends of valve chamber 1572_c_. A valve 1624 is rotatable in chamber 1572_t_ and has portions adapted to close the ports at either side thereof or have said ports open.

Valve block 1592, as shown in FIG. 3, has a chamber 1592_a_ therein in which is movable a valve 1625 urged to its upper position in said valve chamber by a compression coiled spring 1626. Valve 1625 has a valve rod 1625_a_ extending upwardly therefrom connected by a link 1627 to a bell crank lever 1629 pivoted to a bracket carried on the gun housing 11. Lever 1629 also has connected thereto a link 1630 which is connected by a pivot 1631 to the powder case ejectors 1632. Said ejectors 1632 have lips 1632_a_ which are disposed in front of the powder case rim. Member 1631 carries a roller which moves in a slot 1628_a_ of a bracket 1628 carried on the gun housing. The ejector 1632 has an arm 1632_b_ carrying a cam roller 1632_c_ which rolls on the top of bracket 1628 and assists in guiding the movement of ejector 1632. There is an ejector 1632 at each side of the breech and thus at each side of the empty case. The breech block is provided with a recess 1560_b_ in which are disposed the ejectors 1632.

Block 1592 also has therein a valve chamber 1592_b_ in which is disposed a valve casing 1636. A valve 1634 is movable in casing 1636 and is moved to its upper position by a compression coiled spring 1635. Casing 1636 has a central opening at its top above valve 1634 and has annular ports 1636_a_ and 1636_b_ in the sides thereof with which valve 1634 cooperates. A passage 1592_c_ extends from port 1636_a_ to the upper end of valve chamber 1592_a_. A passage 1592_d_ extends from the lower portion of port 1636_a_ to the lower end of valve chamber 1592_a_. A passage 1592_e_ extends from the upper end of valve chamber 1592_b_ to a valve chamber 1592_f_ in which is disposed a valve 1637, which valve is moved to its upper position by a compression coiled spring 1638. A passage 1592_g_ extends from the lower end of valve chamber 1592_a_ to the bottom of valve chamber 1592_f_ and also connects to passage 1572_o_. Passage 1572_o_ extends to and communicates with chamber 1592_f_. Valve 1637 has an upper portion 1637_a_ projecting from block 1592 and adapted to be engaged by the bottom of the breech block when the latter is lowered.

A passage 1592_h_ extends from passage 1572_o_ to a valve chamber 1592_i_ in block 1592. A valve 1640 is disposed in and movable in chamber 1592_i_, the same having a rod at its upper end having therein spaced detent grooves 1640_a_ either of which is adapted to receive a spring pressed detent 1641 for holding valve 1640 in different positions. It will be noted that conduit and passage 1591 communicate with valve chamber 1592_i_ adjacent the upper portion thereof. Valve 1640 has connected to the upper end of the rod extending therefrom a link 1642 in turn connected to a bell crank lever 1643 pivoted to a bracket 1644 secured to the gun housing 11. A lever 1645 is pivoted intermediate its ends to a lug carried on the rammer guide by a pivot 1646 and has an upper portion engaged by a coiled torsion spring 1647. Lever 1645 is held in the position shown in FIG. 3 by spring 1647 and is adapted to be engaged by the rammer spade when the latter moves to ramming position. Lever 1645 has a lower portion adapted to engage a roller 1648 carried on one arm of the bell crank lever 1643.

Valve 1625 has a valve rod depending therefrom through the bottom of block 1592, the same being connected by a link 1650 to one end of a lever 1651 pivoted at its opposite end to a bracket 1652 carried on the gun housing 11. Valve 1640 has a yoke 1640_b_ embracing said lever so that when valve 1625 moves downwardly, lever 1651 can engage yoke 1640_b_ and move valve 1640 downwardly.

A passage 1592_j_ extends from the lower portion of valve chamber 1592_f_ to the upper portion of valve chamber 1592_i_. A conduit and passage 1592_k_ extends from the upper end of passage 1592_j_ to an intermediate point in valve chamber 1597_a_. A passage and conduit 1592_m_ extends from valve chamber 1592_i_ at a point below the upper end of passage 1592_j_ to chamber 1597_a_ below passage 1592_k_. It will be noted that passage 1610 extending from passage 1572_o_ extends along the side of valve chamber 1597_a_ and has several ports communicating with said valve chamber. A passage 1597_b_ extends from one side of valve chamber 1597_a_ and will be connected to accumulator pressure or PA. Passage 1597_b_ has therein a chamber in which is disposed a check valve 1654 preventing passage of fluid outwardly from chamber 1597_a_ through passage 1597_b_. An arm 1653 which moves with lever 1651 about pivot 1652_a_ has connected thereto a link 1656 which is in turn connected to a cylindrical shell 1657 slidable in a bore in an extension of valve block 1597. Member 1657 is bored to receive the cylindrical end of a detent member 1658 which has a front detent portion adapted to enter a recess 1660_a_ in a valve 1660 which is movable in chamber 1597_a_. Member 1658 is urged to move toward valve 1660 and into recess 1660_a_ when possible by a compression coiled spring 1661. Member 1658 has an elongated slot 1658_a_ therein in which is movable a pin 1662 secured to member 1657. When valve 1625 is moved downwardly and lever 1651 is swung about pivot 1652*a*, arm 1652 will be swung counter-clockwise, as shown in FIG. 3 and pin 1662 will be moved to the end of slot 1658*a* so that the detent member 1658 will be held in withdrawn position. When valve 1625 is in its upper position, as shown in FIG. 3, detent 1658 can enter the recess 1660*a* when said recess aligns with member 1658. Valve 1660 is urged to its upper position by a compression coiled spring 1663 engaging the lower end of said valve and the bottom of valve chamber 1597*a*. Valve 1660 has a roller 1665 at its upper end which is urged against the bottom of a portion of the slide 12 which contains a downwardly sloping cam portion 12*g*.

A hand lever 1666, as shown in FIG. 4 is swingable about a pivot 1667 in a bracket 1668 carried on slide 12 and lever 1666 extends below said bracket and is pivotally connected adjacent its lower end to a link 1669 which at its other end is pivotally connected to one arm of a bell crank lever 1670. The other arm 1670*a* of said lever is disposed in position to engage roller 1665 at the top of valve 1660. A latch 1666*a* is spring-pressed to latching position, as seen in FIG. 4, and has a knob at one end for moving it to unlatching position. Latch 1666*a* is extended to operate a switch IWBA. When lever 1666 is unlatched for movement, switch IWBA is moved to position to prevent a rammer operation, which operation would at such time cause damage.

A pair of switches IW2A,B and IWA3,B are shown above the gun housing 11 spaced in the direction of recoil. Said switches have actuating arms which carry rollers adapted to be engaged by the cam surface 11*c* when counter-recoil occurs. Said switches will thus indicate respectively how far the gun is from battery.

*Operation of Breech Block*

Assuming that the breech block is in upper breech closing position, as shown in FIG. 3, a cycle of operation to lower the block occurs as follows. The gun is fired and recoil occurs and valve block 1597 is moved rearwardly with the gun as are also valve blocks 1592 and 1572. As roller 1665 is moved rearwardly it is moved down by cam surface 12*g* and this depresses valve 1660. Detent member 1658 enters recess 1660*a* and holds valve 1660 in this depressed position. PA can now pass from passage 1597*b* around valve 1660, between the upper two lands thereof, through passage 1592*k*, around valve 1640, between the upper two lands thereof, into passage 1591, through valve chamber 1572*e*, through port 1572*g*, chamber 1572*d* and passages 1578*d* to the right-hand end of valve 1578. Valve 1588*a* is moved rearwardly against the pressure of spring 1589 by this pressure so that a free passage is had to passage 1572*g*. When valve 1578 is moved to the left, as shown in FIG. 5, in lowering the block it will cut off passage 1600 when it approaches the end of its movement. The fluid must then pass out through the small passages 1572*i* into annular chamber 1592*h* and through passage 1600. This will give a buffing effect or decelerating movement to the valve and to the block 1560. The PA moves valve 1578 to the left, as shown in FIG. 5. This will move rod 1578*a* and swing lever 1568 to pull down on block 1560 by the link 1565 and the breech block is lowered.

When recoil occurs, valve block 1572 is moved to the right, as shown in FIG. 5, and thus moves relatively to plunger 1603. When the enlarged portion 1603*b* of plunger 1603 enters the smaller part of chamber 1572*k*, the fluid in said chamber is moved by said plunger and passes out through passage 1572*j*, around check valve 1601 and into the annular passage 1572*d* and thus to the right-hand end of valve 1578, as seen in FIG. 5. Thus both pressure formed by recoil and PA are placed on valve 1578. The recoil pressure rises to a much higher figure than the PA. Both are used to be sure to swing lever 1568 and break the toggle formed by said lever and link 1565 and to break the breech block 1560 loose and pull the same downwardly. Lever 1568 is thus swung and the breech block is moved downward.

It will be noted that the fluid forced out of chamber 1572*k* cannot go into passage 1572*n* on acocunt of check valve 1604. It can go into passage 1605 and into chamber 1607*a*. Should the pressure rise sufficiently to move valve 1608 to the right a sufficient distance, the fluid can then move through passage 1607*b*, into passage 1572*n*, into chamber 1572*k* and out through passage 1603*a* to supercharge or tank. Valve 1608 is thus merely a relief valve to control the maximum pressure.

As stated, the bottom of the block engages the plungers 1596 and moves these plungers down against PC or supercharge pressure which is approximately 200 pounds per square inch. The block is thus cushioned or buffed and continues downwardly until it reaches and engages the surfaces 1595*b*. The valve blocks 1595 and plungers 1596 were provided to prevent any bouncing of the breech block when it moves to its lower position. In the first operation of the mount, considerable trouble was encountered due to a bouncing action of the breech block when it reached its ram position. The time cycle of the block in its lowering movement is .06 of a second. The problem presented was solved by the provision of plungers 1596.

When the breech block is thus moved downward, it engages the top of portion 1637*a* and moves valve 1637 downwardly. As stated, PA is now in passage 1592*k* and the same now passes through passage 1592*j*, around valve 1637, between the lands thereof, into passage 1592*e* and to the upper end of valve 1634. Valve 1634 is moved downwardly in shell 1636 and when it moves down sufficiently, PA can pass freely through the upper central opening in shell 1636 and through port 1636*a* and passage 1592*c* to the upper end of valve 1625. Valve 1625 is now moved downwardly, pulling down upon link 1627 and swinging lever 1629. Lever 1629 pulls upon link 1630 and this swings the ejectors 1632 and pulls or ejects the empty powder case from the breech of the gun, which powder case is discharged into the empty case tray. When valve 1625 moves downwardly, it moves the end of lever 1651 downwardly, which lever engages the yoke 1640*b* and moves the same downwardly, thus moving valve 1640 downwardly. Detent 1641 will now enter the upper recess 1640*a*.

When lever 1651 is swung downwardly, arm 1652 is swung in a counter-clockwise direction and detent member 1658 is moved to the left, as shown in FIG. 3, releasing valve 1660 so that it will be raised by spring 1663 when not obstructed by cam surface 12*g*. As soon as there is sufficient recoil, valve 1660 will move up to the position shown in FIG. 3. PA can now pass from passage 1597*b*, around valve 1660, between the lower lands thereof, through passage 1593*a* and passage 1593, into chamber 1595*a* of block 1595. This pressure will now move plungers 1596 to their upper positions, as shown in FIG. 3, and the bottom of the breech block 1560 will be moved from the plane of surfaces 1595 to the plane of the top surfaces of plungers 1596. The breech block is now moved to ram position. However, the breech block is still held down by PA being at the right or rear end of valve 1578.

When valve 1660 moved upwardly, PA was cut off from passage 1592*k* and PA was cut off from the top of valves 1636 and 1625. Spring 1626 now moves valve 1625 upwardly, thus moving link 1627 and swinging lever 1629 and the ejectors 1632 to the position shown in FIG. 3. Ports 1636*a* and the lower part of valve chamber 1592*d* are now ported to supercharge or tank through passages 1592*g*, 1572*o* and 1603*a*. When PA is cut off from passage 1592*k*, as described, spring 1638 will move valve 1637 to its upper position.

The block is now, as stated, in ram position and the gun moves back into battery.

As the rammer moves forwardly to ram the next round into the breech, the rammer spade 1700 moving forwardly contacts lever 1647 swinging the same in a counterclockwise position about pivot 1646. The lower end of lever 1647 engages roller 1648 on lever 1643 and said lever is swung in a clockwise direction, thus pulling up on link 1642 and lifting valve 1640 to its upper position, as shown in FIG. 3. Detent member 1658 is now released since valve 1625 is in its upper position and yoke 1640*b* is in its upper position. Said detent is thus in position to again enter recess 1660*a* when valve 1660 is depressed in the next recoil. When valve 1640 is moved to its upper position the fluid at the right-hand or rear end of valve 1578 can now pass through passages 1578*d*, chamber 1572*d*, chamber 1572*e*, passage 1591 around valve 1640 between the lands thereof, through passage 1592*k*, around valve 1660, through the port next to the top port from chamber 1597*a*, through passage 1610 and to chamber 1572*k*, and through passage 1603*a* to tank.

Also with valve 1660 in its upper position, PA can now pass through passage 1597*b*, around valve 1660 between the lower lands thereof, through passages 1593*a*, 1593 and into chamber 1572*a* at the front or left-hand of valve 1578, as seen in FIG. 5. Valve 1578 is now moved to the right and lever 1568 is swung about its pivot 1570, thus moving link 1565 upwardly and moving block 1560 to its upper position. As valve 1578 moves to its rearmost or right-hand position, as shown in FIG. 5, when the rearmost end part is beyond chamber 1572*d*, some liquid will be trapped. This will force valve 1586 to the left against the pressure of spring 1585 and give a buffing effect. It may be stated that when valve 1578 is moved rearwardly or to the right, the fluid at the right-hand end thereof passes out through passages 1578*d*, into annular chamber 1572*d* and through passage 1572*g* and passages 1587*a* and 1587*b* to conduit 1591, then to valve chamber 1592*i*, around valve 1640 to conduit 1592*k*, around valve 1660, through conduit 1610, through conduit 1572*o* to valve chamber 1572*k* and through passage 1603*a* to PS or tank. When valve 1578 nears the end of its movement the fluid must go through passages 1572*e*, annular chamber 1572*d* and the small passages 1588*a*. This gives a buffing effect. The breech block 1560 is now again in its upper position and all parts have been brought to the position shown in FIGS. 3 and 5.

Apparatus is provided for manually operating the breech block. When it is desired to manually lower the block, lever 1666 will be swung to swing lever 1670 and depress valve 1660. The operator can then operate lever 1614 and operate the pump plunger 1611. If it is desired to lower the block, valve 1624 will be moved clockwise, as shown in FIG. 5, to bring line 1624*a* into coincidence with line 1624*b*. The port at the left-hand side of chamber 1572*t* will now be opened and the port at the right-hand side of said chamber will be closed. Operation of pump plunger 1611 will now force fluid past check valve 1621, around valve 1623 and through passage 1572*v* to the right-hand end of valve 1584. This valve will now be moved to the left, as shown in FIG. 5, and this will move rod 1584*a*, link 1582, valve 1578, rod 1578*a* and link 1573, and will swing lever 1568 to pull down upon link 1565 and lower the block. The fluid at the left-hand side or front side of valve 1584 will pass out through passage 1572*u*, into the chamber of valve 1622, and then through passage 1574*r* to the top of valve 1624 and out through said latter passage to tank. If it is desired to raise the block, valve 1624 will be moved counterclockwise, as shown in FIG. 5, to bring the line 15624*a* into coincidence with line 1624*c*. The port at the right-hand side of chamber 1572*t* will now be opened and the port at the left-hand side of said chamber will be closed. Reciprocation of plungers 1611 will now force liquid past the valve 1620, into the chamber of valve 1622 and through passage 1572*u* to the front or left-hand side of valve 1584. Valve 1584 will now be moved to the right, as shown in FIG. 5, and lever 1568 will be swung to move link 1565 upwardly and move the breech block 1560 to its upper position. The fluid at the right-hand side of valve 1584 can move through passage 1572*v*, into the chamber of valve 1623, and then around the upper side of valve 1624 to tank passage 1572*r*. The breech block 1560 can thus be lowered and raised manually.

The rammer spade has a buffing member to absorb a portion of the impact when the rammer eventually engages the gun housing. Should the housing be too far out of battery proper buffing will not take place and the rammer will batter the housing. Switch IW2AB prevents operation of the rammer until the gun is within one-half inch of battery. Switch IW3AB prevents the lowering of a transfer tray until the gun is within three and thirteen sixteenths of an inch from battery at which time the transfer tray will clear the gun housing.

From the above description it will be seen that we have produced a novel and very efficient gun mount which operates through a remarkably short cycle. The mount is designed for a cycle of one and four tenths seconds. This is the time which elapses from the time the round is raised by the lower hoist until the gun is fired. When the mount is in power operation the only thing that is done manually is the placing of the projectiles and powder cases in the loader. The rotation of the projectile and powder drums, the operation of the lower hoist, the carrier, the upper hoist, the cradle, the transfer trays, the fuse pot mechanism, the rammer, the breech block mechanism, the empty case tray and the case ejecting mechanism operate automatically in sequence. The necessary switches are closed and the actuating solenoids operate in sequence as each one of the previous elements goes through its operation. As set forth in the description, certain switches must be operated before the next operation can take place. All of the operations are thus safeguarded so that there will be no interference.

The device has been amply tested in actual operation and found to be very successful. It has had long tests in the factory and has had a thorough test at the Navy proving grounds. The mount is now being produced in considerable numbers for the Navy.

It will of course be understood that various changes may be made in the form, details, arrangement and proportions of the parts, without departing from the scope of applicants' invention, which generally stated, consists in a device capable of carrying out the objects above set forth, in the parts and combinations of parts disclosed and defined in the appended claims.

What is claimed is:

1. In an automatically operated gun system of the recoil type including means to return the gun tube from a recoiled position to a battery position, an automatically operated breech block assembly operable to open and close the breech of the gun tube, the improvement wherein said automatically operated breech block assembly comprises a breech block, a breech block operating fluid motor, a first link pivotally connected at one end to said breech block, a lever having one end pivotally connected to the other end of said first link, said lever having its other end pivotally mounted on a stationary portion of said gun, said link and said lever disposed in substantially a straight line when said block is in said closed position thereby forming a straightened toggle, said motor being operably connected to said lever at a point intermediate said ends of said lever in a manner wherein said motor is operable to swing said lever about said other end to break said toggle and move said breech block to said open position, a recoil actuated valve operable to control the flow of a first pressurized fluid to said breech block operating motor, said recoil valve being actuated by recoil of said gun to thereby permit the communication of said first pressurized fluid to said breech block operating motor thereby causing said motor to move said breech block to open the breech of said gun tube, fluid pump means operated by said recoil to generate a second pressurized fluid, said second pressurized fluid being communicated to said breech block operating motor in a manner to reinforce said first pressurized fluid during movement of said breech block to open the breech of said gun tube, a rammer valve actuated when a shell is being rammed into said gun tube, said rammer actuated valve and said recoil actuated valve operable to act in conjunction to effect communication of said first pressurized fluid to said breech block operating motor in a manner to cause movement of said breech block to said breech closing position, and buffer means on said breech block operating motor operable to gradually decelerate the terminal movements of said motor.

2. The system set forth in claim 1 wherein cushioning means including a second fluid motor are provided, said first and second pressurized fluids being simultaneously communicated to said cushioning means in a manner whereby said second motor cushions the final movement of said breech block during the breech block operating movement.

References Cited in the file of this patent

UNITED STATES PATENTS

| | | |
|---|---|---|
| 531,157 | Canet | Dec. 18, 1904 |
| 798,882 | Dearborn | Sept. 5, 1905 |
| 1,040,001 | Olsson | Oct. 1, 1912 |
| 1,310,879 | Schneider | July 22, 1919 |
| 1,351,141 | Thompson | Aug. 31, 1920 |
| 1,616,841 | Beebe | Feb. 8. 1927 |
| 1,674,370 | Methlin | June 19, 1928 |
| 2,410,116 | Vickers | Oct. 29, 1946 |
| 2,823,587 | Chadwick et al. | Feb. 18, 1958 |